United States Patent [19]
Gauthier et al.

[11] Patent Number: 5,981,676
[45] Date of Patent: Nov. 9, 1999

[54] METHODS AND COMPOSITIONS FOR IMPROVED OXYGEN SCAVENGING

[75] Inventors: William John Gauthier, Laurel; Drew Ve Speer, Columbia, both of Md.

[73] Assignee: Cryovac, Inc., Duncan, S.C.

[21] Appl. No.: 08/941,266

[22] Filed: Oct. 1, 1997

[51] Int. Cl.$^6$ ............................ C09K 15/02; C09K 15/04
[52] U.S. Cl. ................... 526/308; 252/188.28; 252/397; 526/348
[58] Field of Search ..................................... 526/308, 348; 252/188.28, 397

[56] References Cited

U.S. PATENT DOCUMENTS 5,049,624  9/1991  Adams et al. .
5,211,875  5/1993  Speer et al. .
5,399,289  3/1995  Speer et al. .

FOREIGN PATENT DOCUMENTS 0416815  3/1991  European Pat. Off. .

*Primary Examiner*—Fred Zitomer
*Attorney, Agent, or Firm*—Mark B. Quatt

[57] ABSTRACT

A composition capable of scavenging oxygen composed of (i) a copolymer having long chain branches comprising units derived from monomers of ethylene and at least one vinyl unsaturated alicyclic monomer; (ii) a transition metal catalyst; (iii) preferably, with a photoinitiator; and (iv) optionally, a polymeric diluent.

14 Claims, No Drawings

METHODS AND COMPOSITIONS FOR IMPROVED OXYGEN SCAVENGING

FIELD OF THE INVENTION

The invention generally relates to compositions, articles and methods of scavenging oxygen in environments containing oxygen-sensitive products, particularly food and beverage products. More specifically, the present invention is directed to oxygen scavenger compositions composed of copolymers having long chain branching derived from monomers of ethylene and a vinyl unsaturated alicyclic compound, a transition metal compound and, optionally, a photoinitiator compound. The subject composition can be readily formed into films or blended with other film forming polymers to provide an improved oxygen scavenger packaging material. As will be evident from the disclosure below, the term "oxygen scavenger" or "scavenger" refers to materials which consume, deplete or reduce the amount of oxygen from a given environment.

BACKGROUND OF THE INVENTION

It is well known that limiting the exposure of oxygen-sensitive products to oxygen maintains and enhances the quality and "shelf-life" of the product. For instance, by limiting the oxygen exposure of oxygen sensitive food products in a packaging system, the quality of the food product is maintained, and food spoilage is avoided. In addition, such packaging also keeps the product in inventory longer, thereby reducing costs incurred from waste and having to restock. In the food packaging industry, several means for limiting oxygen exposure have already been developed. At present, the more commonly used means include modified atmosphere packaging (MAP), vacuum packaging and oxygen barrier film packaging. In the first two instances, reduced oxygen environments are employed in the packaging, while in the latter instance, oxygen is physically prevented from entering the packaging environment.

Another, more recent, means for limiting oxygen exposure involves incorporating an oxygen scavenger into the packaging structure. Incorporation of a scavenger in the package can provide a uniform scavenging effect throughout the package. In addition, such incorporation can provide a means of intercepting and scavenging oxygen as it is passing through the walls of the package (herein referred to as an "active oxygen barrier"), thereby maintaining the lowest possible oxygen level throughout the package.

One example of an oxygen scavenger incorporated into an oxygen scavenging wall is illustrated in European Applications 301,719 and 380,319 as well as in PCT 90/00578 and 90/00504. See also U.S. Pat. No. 5,021,515. The oxygen scavenger disclosed in these patent applications comprises polyamide/transition metal catalyst compositions. Through catalyzed scavenging by the polyamide, the package wall regulates the amount of oxygen which reaches the interior of the package (active oxygen barrier). However, it has been found that the onset of useful oxygen scavenging, i.e. up to about 5 cubic centimeters (cc) oxygen per square meter per day at ambient conditions, may not occur for as long as 30 days and, therefore, is not acceptable for many applications.

Further, in regards to the incorporation of the polyamide/catalyst system into the packaging material; polyamides are typically incompatible with the thermoplastic polymers, e.g., ethylene-vinyl acetate copolymers and low density polyethylenes, typically used to make flexible packaging materials and films. Even further, when polyamides are used by themselves to make a flexible package wall, they usually result in inappropriate stiff structures. Polyamides are also more difficult to process when compared with thermoplastic polymers typically used to make flexible packaging.

U.S. Pat. No. 5,399,289 discloses oxygen scavenger compositions composed of ethylenically unsaturated hydrocarbon polymers and transition metal catalysts. The polymers are required to have a low ethylenic double bond content of from 0.01 to 10 equivalents per 100 grams of polymer so as to provide a product with both scavenging properties and retained physical properties. Various conventional homopolymers, copolymers and polymer blends are disclosed. Because these polymers are amorphous materials they are difficult to blend and be processed with film forming semi-crystalline polymers, such as low density polyethylene and the like, which are conventionally used in providing flexible films and the like for packaging applications.

U.S. Pat. No. 5,211,875 also discloses the use of ethylenically unsaturated compounds in conjunction with a transition metal as well as a photoinitiator to facilitate initiation of the effective scavenging activity. The ethylenically unsaturated polymers and copolymers suggested by this reference are also amorphous materials and, therefore, have low compatibility with conventional film forming polymers, such as polyethylenes. Because of the limited compatibility of the scavenger polymer with the film forming polymer, one is required to limit the amount of scavenger polymer in the blend and is usually confronted with a resultant composition which is difficult to process.

It is highly desired to have an oxygen scavenger composition which is composed of a polymeric material having high processability which can be directly formed into films useful in the packaging field or have high compatibility with semi-crystalline polyolefins and provide a highly processable blend with such polymeric materials having known utility for packaging application.

Further, it is highly desired to have a film or composition composed of an ethylenically unsaturated polymer capable of scavenging oxygen which can substantially retain its physical properties after significant oxygen scavenging.

Still further, it is highly desired to provide an oxygen scavenger composition which does not provide, upon oxygen scavenging, by-product formation which can detract from the color, taste or odor of the packaged product.

SUMMARY OF THE INVENTION

The present invention is directed to oxygen scavenger compositions composed of (i) a copolymer having long chain branches comprising units derived from monomers of ethylene and at least one vinyl unsaturated alicyclic monomer; (ii) a transition metal catalyst; (iii) preferably further with a photoinitiator; and (iv) optionally, a polymeric diluent.

The present composition has been found to exhibit a high degree of processability to form film products; to be highly compatible with conventional polymers used in forming films, such as semi-crystalline polyolefins and the like; to exhibit significant ability to scavenge oxygen while part of a film or article used in forming a package for oxygen sensitive products; and to not produce significant by-products which would detract from the packaged product's odor, color and/or taste.

DETAILED DESCRIPTION OF THE INVENTION

The present invention is directed to an oxygen scavenger composition composed (i) of at least one copolymer having long chain branches comprising units derived from ethylene and at least one vinyl unsaturated alicyclic comonomer; (ii) a transition metal catalyst; (iii) preferably further with a photoinitiator; and (iv) optionally, with a polymeric diluent. The present long chain branched copolymer is semi-crystalline to a sufficient degree to be highly compatible with polyolefins and the like conventionally used to provide packaging films and laminated structures and to provide a composition or blends which has high processability, e.g., low susceptibility to melt fracture even under high shear stress conditions such as encountered in extrusion processing.

The novel copolymers found useful in the present invention are fully described in copending U.S. application Ser. No. 08/941,261, concurrently filed with the instant application. The teachings of said copending application are incorporated herein by reference in its entirety.

Processability has been attributed to the structural feature of the presence of long chain branching along the subject copolymer's chain as well as its low molecular weight distribution. Molecular weight distribution or polydispersity of a polymer (the ratio of weight average molecular weight (Mw) to number average molecular weight (Mn) is an influence on the processability. Thus, polymers having a low ratio of Mw/Mn and a high ratio of melt flow index ($I_{10}/I_2$) conducted at different loads (10 Kg and 2 Kg), as described in ASTM D-1238 are indicative of a polymer structure having long chain branching and, in turn, are known to provide desired processability characteristics.

The present oxygen scavenger composition has, as an active scavenger agent, a long chain branched (having branch chains of $\geq 6$ carbon atoms) containing copolymer of ethylene and at least one vinyl unsaturated alicyclic group containing comonomer represented by the formula:

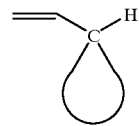  I where

represents a $C_6$–$C_{12}$ ethylenically unsaturated alicyclic group which may further have one or more of its hydrogen atoms of the alicyclic group substituted by a $C_1$–$C_{12}$ hydrocarbon, as fully described below.

The subject copolymer must have ethylene as one of its monomeric forming groups. In addition, the subject copolymer must have, as one of its monomeric forming groups, at least one monomer of formula I, above. This monomer must have (i) a hydrogen atom pendent from the beta carbon and the gamma carbon of the monomer I; (ii) an alicyclic, gamma carbon atom containing group pendent from the beta carbon; (iii) at least one non-aromatic, ethylenic carbon-carbon double bond within the alicyclic group.

The alicyclic, gamma carbon atom containing group is selected from an unsaturated (non-aromatic) $C_6$–$C_{12}$ alicyclic group such as, for example, 2-cyclohexenyl, 3-cyclohexenyl, 2,5-cyclohexadienyl, 2-cyclooctenyl, 3-cyclooctenyl, 4-cyclooctenyl, 2,6-cyclooctadienyl, cyclododecatrienyl and the like. The alicyclic groups, besides having ethylenic unsaturation within the alicyclic group, can have one or more $C_1$–$C_{20}$ hydrocarbon group substitution pendent from the alicyclic ring provided the gamma carbon atom has a pendent hydrogen atom. The substitution can be an aliphatic hydrocarbon, such as, for example, methyl, ethyl, isopropyl, pentyl and the like; an alkenyl group such as, for example, 3-butenyl, 4-hexenyl and the like; or a saturated or unsaturated alicyclic group which may be fused or unfused to the gamma carbon atom containing alicyclic ring.

The subject copolymer may, in addition to the monomers of ethylene and monomer I described above, contain at least one additional monomer other than those defined above. For example, the additional monomer may be a $C_3$–$C_{20}$ alpha-olefin such as propylene, 1-butene, 1-hexene, 3-methyl butene-1, 1-octene 4-methyl pentene and the like; cycloolefins such as, for example, cyclopentene, norbornene, tetracyclododecene and the like; and non-conjugated dienes such as, for example, 5-ethylidene-2-norbornene, 5-vinyl-2-norbornene, 5-methylene-2-norbornene, 2,5-norbornadiene 1,3-divinylcyclohexane, 1,4-divinyl cyclohexane, 1-allyl-5-vinylcyclooctane, dicyclopentadiene, 1,4-hexadiene, 1,7-octadiene and the like.

Ethylene must be a comonomer forming the subject copolymer. It can be present in from about 0.01 to about 99 molar percent of the copolymer, preferably from 25 to 95 molar percent and most preferably from 75 to 90 molar percent of the copolymer formed.

The monomer I must be a comonomer forming the subject copolymer. It can be selected from one or from a mixture (in any proportion) of more than one monomer I. It can be present in from about 1 to about 35 molar percent of the copolymer, preferably from about 1 to 15 and most preferably from about 1 to 10 molar percent of the copolymer formed.

The remainder of the subject copolymer can be formed from other copolymerizable monomeric compounds, as described above.

The resulting copolymer has been found to have a narrow molecular weight distribution and long chain branches as evidenced by its low polydispersity (Mw/Mn) and by its high melt flow index ratio ($I_{10}/I_2$). Its polydispersity normally has a value of at least about 1.5 to about 5 and preferably at least about 1.7 to about 2.5 and most preferably 1.9 to 2.5. In combination, in polymers of low polydispersity, a long chain branched structure is shown to be present by the high values of melt flow index ratio of at least about 8 and preferably 8.5, and more preferably at least about 10, as measured in accordance with ASTM D-1238.

The preferred copolymers of the present invention comprises units derived from comonomers of ethylene and at least one vinyl alicyclic monomer wherein the alicyclic ring contains one ethylenic carbon-carbon double bond as represented by the formula:

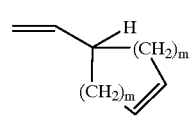  II wherein n and m are each independently selected from positive integers of 0 to 9, provided that the sum of n+m has a value of from 3 to 9 and more preferably from 3 to 5.

The most preferred copolymer of the instant invention is formed from the comonomers of ethylene and vinyl cyclohexene. This copolymer preferably has from about 1 to about 35 mole percent vinyl cyclohexene preferably from about 1 to 10 and most preferably from about 2 to 8 mole percent of vinyl cyclohexenes (which can be determined by carbon-13 nuclear magnetic resonance analysis).

The weight average molecular weight of the subject copolymers will vary depending on the particular monomer I present, the amount of said monomer I present in the copolymer as well as the particular catalyst used in its formation. Normally, the weight average molecular weight will range from about 10,000 to 1,000,000, with from about 25,000 to 125,000 being preferred. Regulating the molecular weight can be accomplished by having hydrogen present in the polymerization reaction vessel during the formation of the subject long chain branched copolymer.

It has been unexpectedly found that the subject long chain branched copolymer can be formed by solution polymerization utilizing certain bridged substantially unstrained metallocene catalysts, as fully described in copending U.S. application Ser. No. 08/941,261 which teaching has been incorporated herein by reference. The solvent forming the polymerization media can be an inert (with respect to the comonomers present) liquid hydrocarbon, which may be, for example, a $C_4$–$C_{10}$ aliphatic hydrocarbon such as, for example, isobutane, pentane, isopentane or the like or mixtures thereof; or an aromatic hydrocarbon, such as, for example, benzene, toluene, xylene or the like. Alternately, the solvent may be one or more of the monomers I or, if appropriate, the third comonomer present in excess either alone or further with an inert diluent, such as those solvents described above. Where a comonomer is used as a solvent for the polymerization, it is preferred that it be selected from a monomer I.

The subject oxygen scavenger composition requires the presence of a transition metal compound, as a scavenger catalyst, in combination with the long chain branched copolymer described above.

The transition metal catalyst may be a salt of a metal selected from the first, second or third transition series of the Periodic Table and preferably those of the series from scandium to zinc (i.e., Sc, Ti, V, Cr, Mn, Fe, Co, Ni, Cu and Zn) with preferably iron, nickel or copper and manganese being more preferred and cobalt being most preferred. Suitable counterions for the metal include, but are not limited to, chloride, acetate, oleate, stearate, palmitate, 2-ethylhexanoate, neodecanoate or naphthenate. Particularly preferable salts include cobalt (II) 2-ethylhexanoate, cobalt oleate and cobalt (II) neodecanoate. The metal salt may also be an ionomer, in which case a polymeric counterion is employed. Such ionomers are well known in the art.

The subject composition when used in forming a packaging article can be composed solely of the above described long chain branched copolymer and transition metal catalyst. However, components such as photoinitiators can be added to further facilitate and control the initiation of oxygen scavenging properties. For instance, it is often preferable to add a photoinitiator, or a blend of different photoinitiators, to the oxygen scavenger compositions, especially when antioxidants are included to prevent premature oxidation of that composition during processing.

Suitable photoinitiators are well known to those skilled in the art as exemplified by the teachings of WO 97/07161 and copending U.S. application Ser. No. 08/857,226, filed May 16, 1997, which is incorporated herein in its entirety by reference. Specific examples include, but are not limited to, benzophenone, o-methoxy-benzophenone, acetophenone, o-methoxy-acetophenone, acenaphthenequinone, methyl ethyl ketone, valerophenone, hexanophenone, α-phenylbutyrophenone, p-morpholinopropiophenone, dibenzosuberone, 4-morpholinobenzophenone, benzoin, benzoin methyl ether, 4-o-morpholinodeoxybenzoin, p-diacetylbenzene, 4-aminobenzophenone, 4'-methoxyacetophenone, substituted and unsubstituted anthraquinones, α-tetralone, 9-acetylphenanthrene, 2-acetyl-phenanthrene, 10-thioxanthenone, 3-acetylphenanthrene, 3-acetylindole, 9-fluorenone, 1-indanone, 1,3,5-triacetylbenzene, thioxanthen-9-one, xanthene-9-one, 7-H-benz[de]anthracen-7-one, benzoin tetrahydropyranyl ether, 4,4'-bis(dimethylamino)-benzophenone, 1'-acetonaphthone, 2'-acetonaphthone, acetonaphthone and 2,3-butanedione, benz[a]anthracene-7,12-dione, 2,2-dimethoxy-2-phenylacetophenone, α,α-diethoxy-acetophenone, α,α-dibutoxyacetophenone, etc. Singlet oxygen generating photosensitizers such as Rose Bengal, methylene blue, and tetraphenyl porphine may also be employed as photoinitiators. Polymeric initiators include poly(ethylene carbon monoxide) and oligo[2-hydroxy-2-methyl-1-[4-(1-methylvinyl)phenyl]propanone]. Use of a photoinitiator is preferable because it generally provides faster and more efficient initiation. When actinic radiation is used, the initiators may also provide initiation at longer wavelengths which are less costly to generate and less harmful.

When a photoinitiator is used, its primary function is to enhance and facilitate the initiation of oxygen scavenging upon exposure to radiation. The amount of photoinitiator can vary. In many instances, the amount will depend on the amount and type of monomer I present in the instant invention, the wavelength and intensity of radiation used, the nature and amount of antioxidants used, as well as the type of photoinitiator used. The amount of photoinitiator also depends on how the scavenging composition is used. For instance, if the photoinitiator-containing composition is placed underneath a layer which is somewhat opaque to the radiation used, more initiator may be needed. For most purposes, however, the amount of photoinitiator, when used, will be in the range of 0.01 to 10% by weight of the total composition. The initiating of oxygen scavenging can be accomplished by exposing the packaging article to actinic or electron beam radiation, as described below.

Antioxidants may be incorporated into the scavenging compositions of this invention to control degradation of the components during compounding and shaping. An antioxidant, as defined herein, is any material which inhibits oxidative degradation or cross-linking of polymers. Typically, such antioxidants are added to facilitate the processing of polymeric materials and/or prolong their useful lifetime. Although such additives prolong the induction period for oxygen scavenging activity to occur in the absence of irradiation, when the layer's or article's scavenging properties are required, the layer or article (and any incorporated photoinitiator) can be exposed to radiation.

Antioxidants such as 2,6-di(t-butyl)-4-methyl-phenol (BHT), 2,2'-methylene-bis(6-t-butyl-p-cresol), triphenylphosphite, tris-(nonylphenyl)phosphite and dilaurylthiodipropionate would be suitable for use with this invention.

When an antioxidant is included as part of the present composition, it should be used in amounts which will prevent oxidation of the scavenger composition's components as well as other materials present in a resultant blend during formation and processing but the amount should be less than that which would interfere with the scavenging activity of the resultant layer, film or article after initiation has occurred. The particular amount needed will depend on the particular components of the composition, the particular antioxidant used, the degree and amount of thermal processing used to form the shaped article, and the dosage and wavelength of radiation applied to initiate oxygen scavenging and can be determined by conventional means. Typically, they are present in about 0.01 to 1% by weight.

The present copolymer has been found to provide a film which is suitable as a packaging material. The present copolymer can be used as the sole polymeric material forming at least one layer of a film (the film may be a multilayer film having, for example, a gas barrier layer, a seal layer, etc.). Alternately, the subject copolymer containing composition can further comprise one or more non-oxygen scavenger diluent polymers known to be useful in packaging film forming materials. Such polymers are thermoplastic and render the film more adaptable for use as packaging layers. Suitable diluent polymers include, but are not limited to, polyethylene, low density polyethylene, very low density polyethylene, ultra-low density polyethylene, high density polyethylene, polyethylene terephthalate (PET), polyvinyl chloride, and ethylene copolymers such as ethylene-vinyl acetate, ethylene-alkyl (meth)acrylates, ethylene(meth)acrylic acid and ethylene-(meth)acrylic acid ionomers. In rigid articles such as beverage containers PET is often used. Blends of different diluent polymers may also be used. Generally, these polymers are semi-crystalline materials useful in forming packaging materials and films. The selection of the polymeric diluent largely depends on the article to be manufactured and the end use thereof. Such selection factors are well known in the art. For instance, certain polymers are known to provide clarity, cleanliness, barrier properties, mechanical properties and/or texture to the resultant article.

Other additives which may also be included in oxygen scavenger layers include, but are not necessarily limited to, fillers, pigments, dyestuffs, stabilizers, processing aids, plasticizers, fire retardants, anti-fog agents, etc.

The amounts of the components which are used in the oxygen scavenging compositions, or layers have an effect on the use, effectiveness and results of this method. Thus, the amounts of copolymer, transition metal catalyst and any photoinitiator, antioxidant, polymeric diluents and additives, can vary depending on the article and its end use.

For instance, one of the primary functions of the long chain branched copolymer described above is to react irreversibly with oxygen during the scavenging process, while the primary function of the transition metal catalyst is to facilitate this process. Thus, to a large extent, the amount of copolymer present will affect the oxygen scavenging capacity of the composition, i.e., affect the amount of oxygen that the composition can consume. The amount of transition metal catalyst will affect the rate at which oxygen is consumed. Because it primarily affects the scavenging rate, the amount of transition metal catalyst may also affect the induction period.

It has been found that the subject long chain branched copolymers, when used as part of the subject composition, provide oxygen scavenger properties at desirable rate and capacity while causing the composition to have enhanced processability and compatibility properties over conventional ethylenically unsaturated polymers. Thus, the present composition can be used to provide, by itself or as a blend with diluent film forming polymers, such as polyolefins and the like, a packaging material or film having enhanced processability properties. Further, it is believed that the subject oxygen scavenger composition consumes and depletes the oxygen within a package cavity without detracting from the color, taste and/or odor of the product contained within the package cavity.

The amount of copolymer of the subject composition may range from 1 to 99%, preferably from 10 to 90%, by weight of the composition or layer composed of said composition in which both copolymer and transition metal catalyst are present (hereinafter referred to as the "scavenging composition", e.g., in a coextruded film, the scavenging composition would comprise the particular layer(s) in which both the copolymer and transition metal catalyst components are present together). Typically, the amount of transition metal catalyst may range from 0.001 to 1% (10 to 10,000 ppm) of the scavenging composition, based on the metal content only (excluding ligands, counterions, etc.). In the event the amount of transition metal catalyst is less than 1%, it follows that the copolymer and any additives will comprise substantially all of the remainder of the composition.

Alternately, when one or more diluent, substantially non-scavenger polymers are used as part of the composition, those polymers can comprise, in total, as much as 99%, preferably up to 75% by weight of the scavenging composition with the subject copolymer and transition metal catalyst and, if appropriate, photoinitiator, present in ratios described above.

Any further additives employed normally will not comprise more than 10% of the scavenging composition, with preferable amounts being less than 5% by weight of the scavenging composition.

The oxygen scavenger composition of the present invention unexpectedly can have enhanced properties not achievable by conventional compositions. Firstly, the copolymer of the present composition can have a high content of unsaturation due to the high molar content of vinyl alicyclic units in the copolymer and/or the ability to form films suitable for packaging applications directly from the copolymer/transition metal composition. Further, the present composition may have a high content of copolymer scavenger agent even when the composition contains a diluent polymer. As stated above, the long branched chain copolymer is highly compatible with known film forming polymers, such as polyolefins and in particular semi-crystalline polymers conventionally used in providing film packaging articles. Because of the high compatibility, the copolymer and other diluent polymer can be readily blended in any ratio. In contrast, prior used amorphous ethylenically unsaturated polymers, do not readily provide high content blends which are suitable for processing (e.g., extruded) into films and the like. Still further, the present composition, whether formed with or without a diluent polymer, has been found to have high processability, that is to have high zero-shear viscosity, low propensity to melt-fracture, high melt tension and a long relaxation time under melt conditions. Thus, the present copolymer can be readily processed (e.g., extruded) at high rates into films having highly desired characteristics (e.g., high clarity, reduced surface imperfections at high extrusion rates) alone or as a layer of a multi-ply film.

As indicated earlier, the composition of the present invention can be used as a single scavenging layer or a scavenging layer present in a multilayer film or in forming other articles for container application. Single layered articles can be readily prepared by extrusion processing. Multilayered articles are typically prepared using coextrusion, coating, lamination or extrusion/lamination, as taught in U.S. Pat. Nos. 5,350,622 and 5,529,833. The additional layers of a multilayered article may include "oxygen barrier" layers, i.e. those layers of material having an oxygen transmission rate equal to or less than 500 cubic centimeters per square meter per day per atmosphere (cc/m²·d·atm) at room temperature, i.e. about 25° C. Typical oxygen barriers comprise poly(ethylenevinylalcohol), poly(vinylalcohol), polyacrylonitrile, polyvinyl chloride, poly(vinylidene dichloride), polyethylene terephthalate, silica, and polyamides such as nylon 6, meta xylylene adipamide (MXD6) and Nylon 6,6 as well as copolymers thereof, as well as metal foil layers.

Other additional layers may include one or more layers which are permeable to oxygen. In one preferred packaging construction, especially for flexible packaging for food, the layers include, in order starting from the outside of the package to the innermost layer of the package, (i) an oxygen barrier layer, (ii) a scavenging layer, i.e. the scavenging composition as defined earlier, and optionally, (iii) an oxygen permeable layer. Control of the oxygen barrier property of (i) allows a means to regulate the scavenging life of the package by limiting the rate of oxygen entry to the scavenging composition (ii), and thus limiting the rate of consumption of scavenging capacity. Control of the oxygen permeability of layer (iii) allows a means to set an upper limit on the rate of oxygen scavenging for the overall structure independent of the composition of the scavenging composition (ii). This can serve the purpose of extending the handling lifetime of the films in the presence of air prior to sealing of the package. Furthermore, layer (iii) can provide a barrier to migration of the individual components in the scavenging films or by-products of scavenging into the package interior. Even further, layer (iii) also improves the heat-sealability, clarity and/or resistance to blocking of the multilayer film.

Further additional layers such as adhesive layers may also be used. Compositions typically used for adhesive layers include anhydride functional polyolefins and other well-known adhesive layers.

The method of this invention comprises exposing the resultant composition to the package cavity having an oxygen sensitive product therein. A preferred embodiment provides for including a photoinitiator as part of the subject composition and subjecting a film, layer or article having the composition to radiation in order to initiate oxygen scavenging at desired rates. To initiate oxygen scavenging in an oxygen scavenger composition is defined herein as facilitating scavenging such that the induction period of oxygen scavenging is significantly reduced or eliminated. As indicated above, the induction period is the period of time before the scavenging composition exhibits useful scavenging properties. Further, initiation of oxygen scavenging may also apply to compositions which have an indeterminate induction period in the absence of radiation.

The radiation used in this method should be actinic, e.g. ultraviolet or visible light having a wavelength of about 200 to 750 nanometers (nm), and preferably having a wavelength of about 200 to 600 nm and most preferably from about 200 to 400 nm. When employing this method, it is preferable to expose the oxygen scavenger to at least 1 Joules per gram of scavenging composition. A typical amount of exposure is in the range of 10 to 2000 Joules per gram. The radiation can also be an electron beam radiation at a dosage of about 2 to 200 kilo Gray, preferably about 10 to 100 kilo Gray. Other sources of radiation include ionizing radiation such as gamma, X-rays and corona discharge. The duration of exposure depends on several factors including, but not limited to, the amount and type of photoinitiator present, thickness of the layers to be exposed, thickness and opacity of intervening layers amount of any antioxidant present, and the wavelength and intensity of the radiation source. The radiation provided by heating of polyolefin and the like polymers (e.g., 100–250° C.) during processing does not provide triggering to take effect.

When using oxygen scavenging layers or articles, the exposure to radiation can be during or after the layer or article is prepared. If the resulting layer or article is to be used to package an oxygen sensitive product, exposure can be just prior to, during, or after packaging. However, in any event, radiation exposure is required prior to using the layer or article as an oxygen scavenger. For best uniformity of radiation, the exposure should be conducted at a processing stage where the layer or article is in the form of a flat sheet.

In order to use the method of this invention in the most efficient manner, it is preferable to determine the oxygen scavenging capabilities, e.g. rate and capacity, of the particular oxygen scavenger composition contemplated for use. To determine the rate of oxygen scavenging, the time elapsed before the scavenger depletes a certain amount of oxygen from a sealed container is measured. In some instances the scavenger's rate can be adequately determined by placing a film comprising the desired scavenger composition in an air-tight, sealed container of a certain oxygen containing atmosphere, e.g. air which typically contains 20.6% oxygen by volume. Then, over a period of time, samples of the atmosphere inside the container are removed to determine the percentage of oxygen remaining. Usually, the specific rates obtained will vary under different temperature and atmospheric conditions. Atmospheres having lower initial oxygen content and/or conducted under low temperature conditions provide a more stringent test of a composition scavenging ability and rate. The rates indicated below are at room temperature and one atmosphere of air because they represent the conditions under which, in many instances, the oxygen scavenger composition and/or layers and articles prepared therefrom will be used.

When an active oxygen barrier is needed, a useful scavenging rate can be as low as 0.05 cc oxygen ($O_2$) per gram of the copolymer in the scavenging composition per day in air at 25° C. and at 1 atmosphere pressure. However, in most instances, it has been found that the present compositions have the capability of rates equal to or greater than 0.5 cc and even 5 or greater cc oxygen per gram per day. Further, films or layers comprising the subject composition are capable of a scavenging rate greater than 10 cc oxygen per square meter per day, and can have an oxygen scavenging rate equal to or greater than about 25 cc oxygen per square meter per day under some conditions. Such rates make those layers suitable for scavenging oxygen from within a package, as well as suitable for active oxygen barrier applications. Generally, film or layers generally deemed suitable for use as an active oxygen barrier can have a scavenging rate as low as one cc oxygen per square meter per day when measured in air at 25° C. and 1 atmosphere pressure.

When it is desired to use this method with an active oxygen barrier application, the initiated oxygen scavenging activity, in combination with any oxygen barriers, should create an overall oxygen transmission rate of less than about 1.0 cubic centimeters per square meter per day per atmosphere at 25° C. The oxygen scavenging capacity should be such that this transmission rate is not exceeded for at least two days.

Once scavenging has been initiated, the scavenger composition, layer or article prepared therefrom, should be able to scavenge up to its capacity, i.e. the amount of oxygen which the scavenger is capable of consuming before it becomes ineffective. In actual use, the capacity required for a given application depends on:

(1) the quantity of oxygen initially present in the package,
(2) the rate of oxygen entry into the package in the absence of the scavenging property, and
(3) the intended shelf life for the package.

When using scavengers comprising the subject copolymer containing composition, the capacity can be as low as 1 cc oxygen per gram, but can be 50 cc or higher of oxygen per gram. When such scavengers are in a layer of a film, the layer will preferably have an oxygen capacity of at least about 250 cc oxygen per square meter per mil thickness and more preferably at least 1200 cc oxygen per square meter per mil thickness of said layer.

The present composition has been found to provide a film, layer or article which substantially retains its physical properties of tensile strength and modulus even after substantial oxygen scavenging has occurred. In addition, the present composition does not provide by-product or effluent which would impart undesired taste, color and/or odor to the packaged product. The term "exposed to the interior" refers to a portion of a packaging article having the subject scavenger composition which is either directly exposed or indirectly exposed (via layers which are $O_2$ permeable) to the interior cavity having oxygen sensitive product.

The following examples are given for illustrative purposes only and are not meant to be a limitation on the invention as defined by the appended claims. All parts and percentages are by weight unless otherwise stated.

EXAMPLE 1

Oxygen Scavenging with Poly(ethylene-co-vinylcyclohexene) Films

A copolymer of ethylene and 4-vinyl cyclohexene (7 mole % by NMR) having long chain branches ($T_m$=83° C., $I_2$=0.67, $I_{10}/I_2$=12.7, $M_w$=74,000 Polydispersity=2.2) was melt compounded at 140° C. with 680 ppm cobalt from a commercially available cobalt neodecanoate (Ten-Cem® of OMG Inc.), 1000 ppm 4,4'-dimethylbenzophenone, and 500 ppm of a hindered phenolic antioxidant (Irganox® 1076 Ciba). A film was formed from this composition and a 200 cm² specimen was irradiated (triggered) with UVC radiation to dose of 800 mJ/cm². The specimen was vacuum sealed in a barrier pouch (Cryovac® P640B) and the pouch was inflated with 300 cc of 1% oxygen in nitrogen (this oxygen plus residual air in the pouch provided the initial content of oxygen) and was stored at 4° C. for the duration of the test. Samples of the atmosphere (4 cc) were periodically withdraw for oxygen analysis using a MOCON model LC 700F gas analyzer with the following results:

| Time (days after triggering) | Percent Oxygen |
| --- | --- |
| 0 | 1.17 |
| 1 | 1.10 |
| 2 | 1.01 |
| 5 | 0.78 |
| 8 | 0.62 |
| 14 | 0.30 |
| 22 | 0.24 |

These data clearly show that semi-crystalline, long-chain branched EVCH is suitable for scavenging oxygen even under low temperature conditions and at low initial oxygen content. Scavenging effects at ambient temperature and higher initial oxygen content would be even more dramatic.

EXAMPLE 2

A sample of a copolymer compound of ethylene and 4-vinyl cyclohexene (6.5 mole % by NMR) having long chain branches ($T_m$=88° C., $I_2$=0.06, $I_{10}/I_2$=21.4, Mw=97,000, Polydispersity=2.2) was melt formulated as described in Example 1, except that the hindered phenolic level was 1360 ppm. The sample was irradiated and tested as described in Example 1 with the following results:

| Time (days after triggering) | Percent Oxygen |
| --- | --- |
| 0 | 1.12 |
| 1 | 0.91 |
| 4 | 0.43 |
| 7 | 0.23 |
| 14 | 0.10 |
| 21 | 0.06 |

These data further show that semi-crystalline, long-chain branched EVCH can be prepared into a film and is suitable for scavenging oxygen even under low temperature conditions and at low initial oxygen content.

What is claimed:

1. A composition suitable for scavenging oxygen comprising a mixture of:

(a) at least one copolymer comprising units formed from (i) ethylene and (ii) at least one vinyl unsaturated alicyclic monomer represented by the formula:

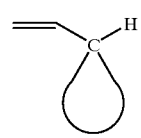

wherein

represents an unsubstituted or substituted $C_6$–$C_{12}$ non-aromatic ethylenic unsaturated alicyclic group, said copolymer having units formed from said at least one vinyl unsaturated alicyclic monomer in from 1 to 35 mole percent of said copolymer, having long chain branches of at least 6 carbon atoms present in an amount to cause said copolymer to have a melt flow index ratio ($I_{10}/I_2$) of at least about 8, and having a polydispersity (Mw/Mn) of about 1.5 to 5; and (b) a transition metal catalyst.

2. The composition of claim 1 wherein the copolymer further comprises units formed from a monomer selected from a $C_3$–$C_{20}$ alpha-olefin, cycloolefin, non-conjugated dienes and mixtures thereof.

3. The composition of claim 1 wherein said mixture further contains at least one photoinitiator compound.

4. The composition of claim 2 wherein said mixture further contains at least one photoinitiator compound.

5. The composition of claim 1 wherein the mixture further comprises at least one diluent polymer.

6. The composition of claim 2 wherein the mixture further comprises at least one diluent polymer.

7. The composition of claim 3 wherein the mixture further comprises at least one diluent polymer.

8. The composition of claim 4 wherein the mixture further comprises at least one diluent polymer.

9. The composition of claims 1, 2, 3, 4, 5, 6, 7 or 8 wherein the copolymer units formed from said at least one vinyl unsaturated alicyclic monomer are present in from 1 to 15 mole percent of said copolymer.

10. The composition of claim 9 wherein at least one of said vinyl unsaturated alicyclic units of said copolymer has one ethylenic carbon-carbon group within said alicyclic group.

11. The composition of claim 9 wherein the copolymer comprises monomeric units found from ethylene and vinyl cyclcohexene.

12. The composition of claim 1, 2, 3 or 6 wherein the copolymer units formed from said at least one vinyl unsaturated alicyclic monomer are present in from about 1 to 15 mole percent of said copolymer.

13. The composition of claim 1, 2, 3, 4, 5 or 6 wherein the copolymer has long chain branches of at least 6 carbon atoms, polydispersity of from at least about 1.5 to 5 and melt flow index of at least 8.5.

14. The composition of claim 1 wherein the copolymer is formed from ethylene and vinyl cyclohexene.

* * * * *